United States Patent [19]

Takeuchi

[11] E Patent Number: Re. 31,653

[45] Reissued Date of Patent: Aug. 28, 1984

[54] ELECTRONIC MUSICAL INSTRUMENT OF THE HARMONIC SYNTHESIS TYPE

[75] Inventor: Chifumi Takeuchi, Hamamatsu, Japan

[73] Assignee: Nippon Gakki Seizo Kabushiki Kaisha, Hamamatsu, Japan

[21] Appl. No.: 431,738

[22] Filed: Sep. 30, 1982

Related U.S. Patent Documents

Reissue of:

[64] Patent No.: 4,256,004
Issued: Mar. 17, 1981
Appl. No.: 32,092
Filed: Apr. 20, 1979

[30] Foreign Application Priority Data

Apr. 24, 1978 [JP] Japan ..... 53-48402

[51] Int. Cl.[3] ..... G10H 1/06

[52] U.S. Cl. ..... 84/1.21; 84/1.12; 84/1.22

[58] Field of Search ..... 84/1.01, 1.11, 1.12, 84/1.19, 1.21–1.24; 328/14–18

[56] References Cited

U.S. PATENT DOCUMENTS

| | | | |
|---|---|---|---|
| 1,956,350 | 4/1934 | Hammond | 84/1.21 X |
| 3,390,223 | 6/1968 | Wayne | 84/1.24 |
| 3,505,462 | 4/1970 | Wayne | 84/1.19 X |
| 3,809,786 | 5/1974 | Deutsch | 84/1.01 |
| 3,809,788 | 5/1974 | Deutsch | 84/1.01 |
| 3,845,395 | 10/1974 | Murphree | 328/14 |
| 3,913,442 | 10/1975 | Deutsch | 84/1.19 |
| 3,952,189 | 4/1976 | Fabricius | 328/14 X |
| 3,956,960 | 5/1976 | Deutsch | 84/1.19 |
| 3,992,971 | 11/1976 | Chibana et al. | 84/1.11 |
| 4,026,179 | 5/1977 | Futamase | 84/1.01 X |
| 4,103,582 | 8/1978 | Chibana | 84/1.11 X |
| 4,108,040 | 8/1978 | Chibana et al. | 84/1.19 |
| 4,114,498 | 9/1978 | Chibana et al. | 84/1.19 |
| 4,133,242 | 1/1979 | Nagai et al. | 84/1.22 X |
| 4,150,600 | 4/1979 | Deutsch | 84/1.11 |

*Primary Examiner*—Stanley J. Witkowski
*Attorney, Agent, or Firm*—Spensley, Horn, Jubas & Lubitz

[57] ABSTRACT

An electronic musical instrument is of a harmonic synthesis type and is provided with an order number memory device which stores a plurality of order numbers of the harmonic components necessary to form respective tone colors, an amplitude coefficient memory device which stores a plurality of sets of amplitude coefficients for the respective harmonic components corresponding to the respective order of numbers stored in the order number memory device, and a tone color selector which controls the order number memory device and the amplitude coefficient memory device, when a certain tone color is selected, for causing the respective memory devices to produce the order numbers and the amplitude coefficients of a set corresponding to the selected tone color. According to the order numbers, respective harmonic component waves of a certain amplitude are produced and are multiplied with the amplitude coefficients and the multiplication products thus obtained are combined to synthesize musical tones having the selected tone color.

By providing only necessary order numbers and coefficients, the memory size becomes small and the synthesizing speed becomes high.

11 Claims, 2 Drawing Figures

ELECTRONIC MUSICAL INSTRUMENT OF THE HARMONIC SYNTHESIS TYPE

Matter enclosed in heavy brackets [ ] appears in the original patent but forms no part of this reissue specification; matter printed in italics indicates the additions made by reissue.

BACKGROUND OF THE INVENTION

This invention relates to an improvement of an electronic musical instrument of a harmonic synthesis type wherein a fundamental wave (basic tone) corresponding to the tone pitch of an operated key in a keyboard and respective components of its harmonic waves (over tones) are multiplied with corresponding amplitude coefficients respectively and then the multiplication products are combined to synthesize musical tones.

Among the electronic musical instrument of this type may be mentioned a system in which amplitude values of a musical tone waveform at successive sampling points are calculated according to the following equation 1 to produce a musical tone.

$$X_0(qR) = \sum_{n=1}^{\frac{N}{2}} C_n \sin \frac{\pi}{W} nqR \qquad 1$$

where q: a positive integer $X_0(qR)$: amplitude value of a musical tone waveform at each sampling point R: value proportional to the frequency (tone pitch) of the generated musical tone (hereinafter called a frequency information)

n: orders of respective harmonic wave components including fundamental wave, where n=1 corresponds to the fundamental wave (fundamental tone)

n=2 corresponds to the second harmonic wave n=3 corresponds to the third harmonic wave $C_n$: amplitude coefficients for harmonic wave components at respective orders (Fourier coefficients)

N: number of successive sampling points of one musical tone wave at the highest frequency of the generated musical tone W:total number of the harmonic waves to be synthesized at each sampling point, the relationship between N and W is W=N/2.

In the following description, the term harmonic wave includes the fundamental wave so that the fundamental wave is expressed as the first harmonic wave.

One example of an electronic musical instrument of a harmonic synthesis type is disclosed in U.S. Pat. No. 3,809,786 to Ralph Deutsch dated May, 7, 1974 under the title of Computor organ.

However, according to the prior art electronic musical instrument of the harmonic wave synthesizing system, the musical tone is generated at a frequency correponding to the tone pitch of a depressed key, with a tone color set by a harmonic wave amplitude coefficient $C_n$ stored in a harmonic wave coefficient memory device and imparted with an amplitude envelope. To synthesise such a musical tone, it is necessary to compute amplitude values $F_n$ of all (W) harmonic wave components including the first to Wth harmonic waves. With this method, however, the number of orders of the harmonic wave component to be calculated for the purpose of synthesizing a musical tone is up to the Wth order, so that it has been impossible to generate harmonic wave components higher than this order. Accordingly, it has been impossible to generate a musical tone having a tone color containing harmonic wave components of extremely high orders (for example, higher than Wth order). Where it is desired to produce a musical tone having a tone color containing harmonic wave components of the orders higher than the Wth order, it takes a longer time for mathematically processing to form the desired musical tone thus decreasing the performance efficiency of the electronic musical instrument. To limit the mathematical processing time to be less than a predetermined time it is necessary to either shorten the period of the clock pulse or to proceed the mathematical operations in parallel, thus complicating the contruction.

Another solution of this problem is disclosed in U.S. Pat. No. 3,992,971 to Masanobu Chibana, et al, dated Nov. 23, 1976 under a title of "Electronic Musical Instrument" wherein the amplitude values of the harmonic wave components of the adjacent orders are calculated simultaneously by noting the fact that the levels (amplitude coefficients) of the harmonic components of adjacent orders are nearly equal. With this method, however, although it is possible to generate harmonic wave components up to high orders without complicating the circuit construction, as the harmonic wave amplitude coefficients of adjacent orders are averaged it becomes impossible to generate musical tones of high quality and delicate tone color.

SUMMARY OF THE INVENTION

Accordingly, it is the principal object of this invention to provide an electronic musical instrument of the harmonic wave synthesizing type capable of selectively producing musical tones having a high quality, a delicate tone color and a high performance ability.

Another object of this invention is to provide an electronic musical instrument of the harmonic waveform synthesizing type capable of decreasing the mathematical processing time with respect to prior art systems even though the generated musical tone contains one or more harmonic wave components of high orders which are necessary to produce a desired tone color.

Still another object of this invention is to provide an electronic musical instrument of the harmonic wave component synthesizing type capable of producing a musical tone having a desired tone color and high quality with a relatively simple circuit construction.

Generally stated according to this invention, these and further objects can be accomplished by selectively calculating the orders of harmonic wave components required to form a musical tone having a desired tone color so as to generate the harmonic wave components of only the orders necessary to obtain the desired tone color.

According to this invention, there is provided an electronic musical instrument of the harmonic wave synthesizing type comprising means for generating a frequency information corresponding to a tone pitch of a depressed key of the keyboard of the electronic musical instrument, an order number memory device adapted to store the number of orders of harmonic wave components required to produce a tone color of a musical tone to be produced, an amplitude coefficient memory device adapted to store amplitude values of the harmonic wave components corresponding to an order number stored in the order number memory device, means responsive to the output of the frequency information generating means and to the outputs of the order number memory device for producing a plurality of tone partial component waves having instantaneous amplitudes which vary with time, multiplying means for multiplying the instantaneous amplitudes with corresponding outputs of the amplitude coefficient memory device, and means for synthesizing the products produced by the multiplying means.

According to a modified embodiment of this invention, the electronic musical instrument just described further comprises means for selecting an order number stored in the order number memory device and an amplitude coefficient memory device in accordance with a musical tone to be generated.

DESCRIPTION OF THE PREFERRED EMBODIMENTS

Figure 1:
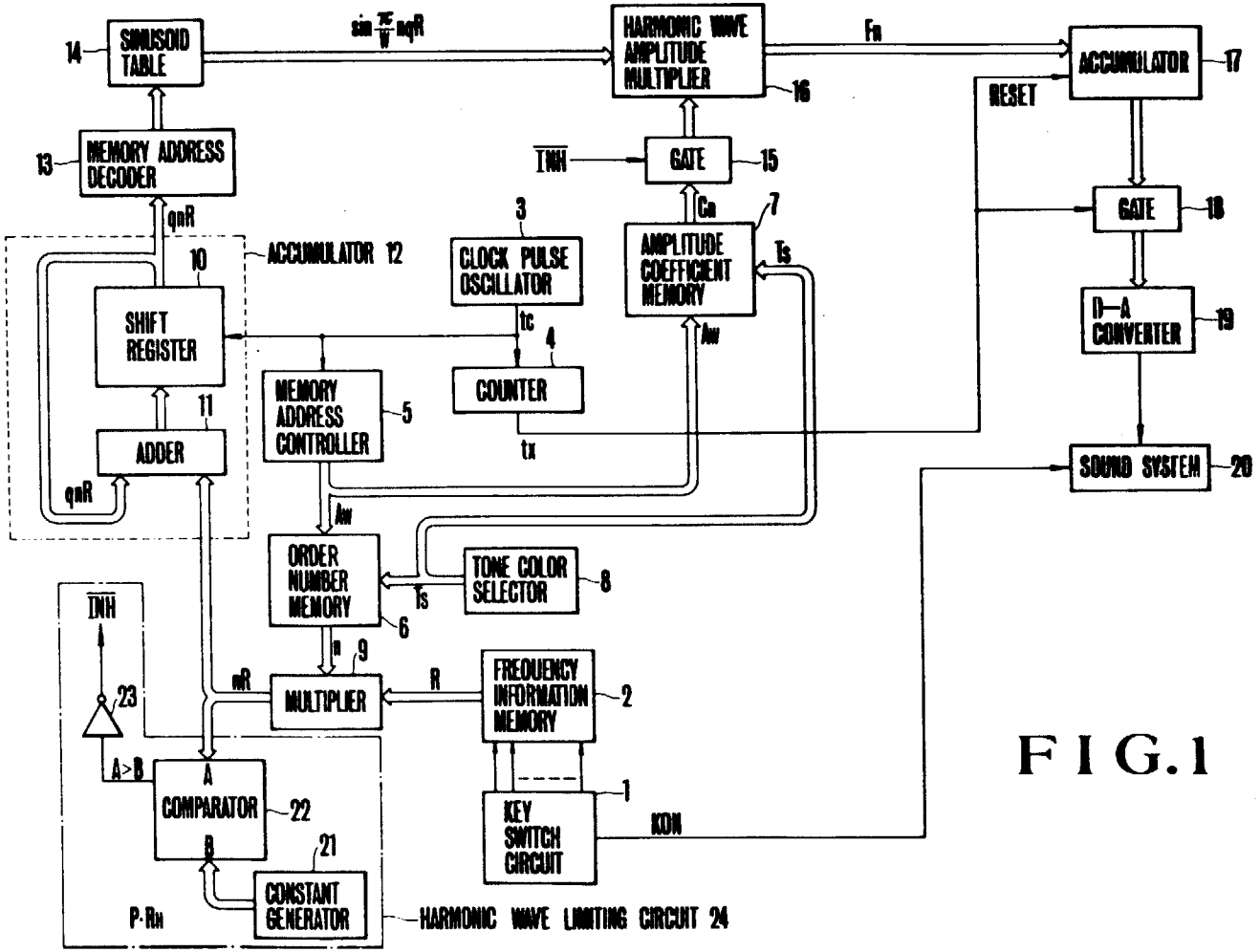
FIG. 1 is a block diagram showing one embodiment of the electronic musical instrument of the harmonic wave synthesizing type constructed in accordance with this invention.

A preferred embodiment of the electronic musical instrument of this invention shown in FIG. 1 comprises a key switch circuit 1 provided for the keyboard (not shown) of the electronic musical instrument and includes a plurality of key switches corresponding to respective keys of the keyboard so that when one of the keys is depressed a key switch corresponding thereto operates to produce a binary "1" signal on the corresponding output line. Although not shown, the key switch circuit 1 contains a preferential circuit of the monophonic construction so that when two or more key switches are operated simultaneously, the "1" signal is produced on only the output line corresponding to a key switch having a highest order of preference.

The output lines corresponding to respective key switches of the key switch circuit 1 are connected to a frequency information memory device 2 which stores frequency information corresponding to the tone pitches of respective keys. The frequency information memory device is addressed by the output of a key switch circuit 1 corresponding to a depressed key to read out a frequency information R corresponding thereto from the frequency information memory device 2.

There is provided a clock pulse oscillator 3 to generate a clock pulse $t_c$ having a definite period, the frequency of the clock pulse $t_c$ being reduced by W by a counter 4 to form a computation interval timing signal $t_x$, where W represents the total number of the harmonic waves to be synthesized. Thus, when it is desired to synthesize sixteen harmonic waves, W=16.

A memory address controller 5 comprising a counter of modulo W is provided to count the number of the clock pulses $t_c$ of the definite period produced by the clock pulse oscillator so as to apply its output to an amplitude coefficient memory device 7 to act as an address signal $A_w$ (W=1,2, . . . W). The order number memory device 6 stores a plurality of sets of order numbers n representing the orders of respective harmonic components that can be synthesized for forming a musical tone, the number of the sets corresponding to the number of a plurality of tone colors. Although the total number of one set of the order numbers $(n)_1 \ldots n_w)$ is W (W=16, for example) at maximum, the order number n may contain a number W' which is larger than W, and in some cases may contain a number which is smaller than one, for example, 0.5. The amplitude coefficient memory device 7 stores a plurality of sets of amplitude coefficients $C_n$ for the plurality of tone colors for setting the amplitude values of respective harmonic components corresponding to the order numbers n. The amplitude coefficient memory device 7 and the order number memory device 6 store data as shown in the following Table 1, for example.

TABLE 1

| | order number memory device | amplitude coefficient memory device |
|---|---|---|
| | $n_1, n_2, n_3 \ldots n_{16}(n_W)$ | $C_{n1}, C_{n2}, C_{n3} \ldots C_{n16}(C_{nW})$ |
| tone color A | 1 2 4 . . . 20 | $C_1\ C_2\ C_4 \ldots C_{20}$ |
| tone color B | 1 3 9 . . . 64 | $C_1\ C_3\ C_9 \ldots C_{64}$ |

The order number memory device 6 is constructed to deliver different number of order numbers in accordance with the tone color of the musical tone to be generated or to produce a predetermined number of order numbers irrespective of the tone color of the musical tone to be generated. The same is true for the amplitude coefficient memory device 7.

There is also provided a tone color selector 8 for selecting a desired tone color the generated musical tone, and a tone color selection signal $T_s$ produced thereby is applied to the order number memory device 6 and the amplitude coefficient memory device 7 to act as an address signal for causing them to produce order numbers n and amplitude coefficients $C_n$ both of a set corresponding to the color selection signal $T_s$ respectively. There are also provided a multiplier 9 which is addressed by the address signal $A_w$ produced by the memory address controller 5 and the tone color selection signal $T_s$ produced by the tone color selector 8 for multiplying the order number n ($n_1 \ldots n_{16}$) sequentially read out from the order number memory device 6 and the frequency information read out from the frequency information memory device 2; a W-stage shift register 10 shifted by the clock pulse $t_C$, and to an adder 11 which adds together the product nR ($n_1R$ . . . $n_wR$) produced by the multiplier 9 and the output qnR ($qn_1R$ . . . $qn_wR$) of the shift register 10 for applying the sum (nR+qnR) to the input or first stage of the shift register 10. It is to be understood that the output nR of the multiplier 9 and the output qnR produced by the Wth stage of the shift register 10, which are applied to the adder 11, relate to the same order number and are synchronous with each other. Consequently the shift register 10 and the adder 11 constitute an accumulator 12 which sequentially accumulated the products nR ($n_1R$ . . . $n_wR$) produced by the multiplier 9 for each order number to produce an accumulated value qnR (q=1,2,3, . . . ), which in turn is applied to a memory address decoder 13. Each of the accumulated values represents the phase angle of the nth order harmonic wave at a sampling point now being computed and is decoded by the memory address decoder 13. The decoded output is applied to a sinusoid table 14 to act as an address signal, which is storing at respective addresses the amplitude values of successive sampling points of one period of a sinusoidal waveform to read out a sinusoid amplitude value sin ($\pi$/W) nqR.

The sinusoid table, that is a sine function memory device 14 sequentially produces the sine wave amplitude values sin ($\pi$/W) nqR (n=1,2 . . . W) at a given sampling point qR in the order of the fundamental wave (the first harmonic wave), the second harmonic wave, . . . the Wth harmonic wave. In this regard, the sampling point of the musical waveform to be computed is sequentially shifted each time a computation interval timing signal $t_x$ is generated, and to which sampling point is to be shifted next time is determined by the frequency information R which is proportional to the tone pitch of the depressed key. As a consequence, the sinusoid table 14 produces, on a time division basis, sine wave amplitude values sin ($\pi$/W) nqR of respective harmonic waves corresponding to the tone pitch of the depressed key.

The output $C_n$ of the harmonic wave coefficient memory device 7 is applied to a harmonic wave amplitude amplifier 16 through a gate circuit 15. The harmonic wave amplitude multiplier 16 multiplies the sine wave amplitude values sin ($\pi$/W) nqR of respective harmonic waves which are read out from the sinusoid table 14 at respective sampling points on the time division basis with the harmonic amplitude coefficient $C_n$ selected for each harmonic wave thus supplying the sum $F_n = C_n \sin(\pi/W)\, nqR$ to an accumulator 17. Since the memory address controller 5 is synchronized with the accumulator 10, the harmonic wave amplitude coefficient $C_n$ sequentially read out for each harmonic wave is multiplied with a corresponding harmonic sine wave amplitude value sin ($\pi$/W) nqR thus setting the amplitude value $F_n$ for each harmonic wave. The accumulator 17 operates to sequentially accumulate the amplitude value $F_n$ of each harmonic wave produced by the harmonic wave amplitude multiplier 16. In response to a computation interval timing signal $t_x$, the gate circuit 18 is opened to apply the accumulated value of the accumulator 17 (which represents the amplitude value at a sampling point of a musical tone waveform) to an digital-analogue converter 19. At the same time, the accumulator 17 is reset for performing the same accumulating operation to calculate the amplitude value at the next sampling point. Consequently, each time a computation interval timing signal $t_x$ is generated, the amplitude value (a digital signal) at each sampling point of a musical tone having a waveform determined by each harmonic wave amplitude coefficient $C_n$ is applied to the digital-analogue converter 19 and converted into an analogue signal which is applied to a sound system 20 to produce a musical tone having a tone pitch corresponding to the depressed key and a toner color corresponding to the harmonic wave amplitude coefficients stored in the harmonic coefficient memory device 7.

An amplitude envelope is applied to the generated musical tone in the following manner. More particularly, the sound system 20 is, as in a conventional electronic musical instrument, provided with an envelope waveform generator, not shown, which starts to operate in response to a key-on signal KON produced by the key switch circuit 1 when a certain one of the keys is depressed. The envelope waveform generated by the envelope waveform generator is multiplied by a musical tone signal to impart an amplitude envelope to the generated musical tone having an attack, a sustain and a decay portion.

A constant generator 21, a comparator 22 and an inverter 23 constitute a harmonic wave limiting circuit 24 which prevents generation of a certain harmonic component. The operation thereof will be described later. The output of the inverter 23 is supplied to the gate circuit 15. At the present stage of description it is assumed that the harmonic wave limiting circuit 24 is not provided.

The electronic musical instrument shown in FIG. 1 operates as follows. Thus, the player firstly sets a desired tone color of the musical tone to be generated, for example a tone color A shown in Table 1 above, in the tone color selector 8 and then depresses a key on the keyboard. Then a key switch of the key switch circuit 1 corresponding to the depressed key is closed to produce a signal "1" on a corresponding output line. This output signal "1" is applied to the frequency information memory device 2 as an address signal to read out therefrom a frequency information R corresponding to the tone pitch of the depressed key.

The memory address controller 5 counts the clock pulses $t_c$ produced by the clock pulse oscillator 3 to supply its output $A_w$ to the order number memory device 6 and the amplitude coefficient memory device 7 to act as address signal. Then, order numbers n ($n_1 \ldots n_w$) are sequentially read out in the order of $n_1=1$, $n_2=2$, $n_3=4 \ldots n_w=20$ from the respective addresses of the order number memory device 6 corresponding to the address signals $A_w$ provided by the memory address controller 5 and in a set corresponding to the tone selection signal $T_s$ (representing the set tone color A) produced from the tone color selector 8. The order numbers n ($n_1 \ldots b_w$) read out from the order number memory device 6 for producing the desired tone color A selected are multiplied with the frequency information R read out from the frequency information memory device 5 in the multiplier 9 and its products nR ($n_1R=1R$, $n_2R=2R$, $n_3R=4R$, . . . $n_wR=20R$) are supplied to the accumulator 12. The product nR supplied to the accumulator 12 is added to the output qnR of the shift register 10 by adder 11 and the sum is supplied to the first stage of shift register 10 and then sequentially shifted by the clock pulse $t_c$. At the early stage of this operation, since the counts of respective stages of the shift register 10 are all zero, at the first computation interval timing signal $t_{x1}$ the product nR ($n_1R=1R$, $n_2R=2R$, $n_3R=4R$, . . . $n_wR=20$) of the multiplier 9 would be applied and stored without any change. At the second computation interval timing signal $t_{x2}$ the shift register 23 sequentially produces accumulated value qnR, where q=1, $1n_1R$, $1n_2R$, . . . 1nhd wE. At the same time, the accumulated value qnR (q=1) of the shift register 10 and the product nR of the multiplier 9 are added together by adder 11 and its sum nR+1nR (2ndR) is applied to the first stage of the shift register 10. Consequently the counts at respective stages of shift register 10 are changed to $2n_1R=2R$, $2n_2R=4R$, $2n_3R=8R$ . . . $2n_wR=40R$, respectively, and these counts are sequentially sent out from the shift register 10 with the timing of the clock pulse $t_c$ during the period of the next computation interval timing signal $t_{x3}$. By repeating this operation, the accumulator 12 sequentially produces the accumulated value qnR for R producing the sine wave amplitude value sin ($\pi$/W) nqR at each sampling point (corresponding to qR) of the musical tone waveform.

The accumulated value qnR thus produced from the accumulator 12 is converted into an address signal by the memory address decoder 13 and then supplied to the sinusoid table 14, whereby the sine wave amplitude value sin ($\pi$/W) nqR of a harmonic wave is read out from an address of the sinusoid table 14 corresponding to the accumulated value qnR. The sine wave amplitude value sin ($\pi$/W) nqR of each harmonic wave read out from the sinusoid table 14 is multiplied by the harmonic wave amplitude multiplier 16 with the amplitude coefficient $C_n$($C_n$:$C_{n1}=C_1$, $C_{n2}=C_2$, $C_{n3}=C_4 \ldots C_{nW}=C_{20}$) of an address corresponding to the address signal $A_w$, in a pair corresponding to the selected tone color A sequentially read out from the amplitude coefficient memory device 7 by being addressed by the tone color selection signal $T_{sa}$ representing the selected tone color A and the address signal $A_w$ thus setting respective amplitude values of respective harmonic waves (n=1,2,4 . . . 20). This amplitude value $F_n$ is sequentially accumulated by the accumulator 17, and the accumulated value supplied to the digital-analogue converter accumulated value is supplied to the digital-analogue converter 19 via the gate circuit 18 each time the computation period timing signal $t_x$ is generated, whereby a musical tone having a tone color corresponding to the tone color A selected by the tone color selector 8 is generated by the sound system 20. Thus, the sound system 20 produces a musical tone having a tone color A synthesized from harmonic wave components of the desired orders.

Accordingly, in the electronic musical instrument constructed in accordance with this embodiment, even when the total number of the harmonic components, that can be synthesized is limited to W, by preparing an order number n larger than W and an amplitude coefficient corresponding to n for the order number memory device 6 and the amplitude coefficient memory device 7, it is possible to freely select the number of orders of the harmonic wave component in a range of from 0 to W. Consequently, synthesis of the musical tones containing harmonics of considerable orders can be made without using complicated and elaborate circuit construction. Moreover the tone color can also be selected freely. For instance, the tone of a flute can be produced with only the first harmonic component, the tone of an oboe can be produced so long as the second harmonic component is not present, and the tone of a clarinet can be produced by harmonic components of odd orders, so that the electronic musical instrument of this invention can produce musical tones having tone colors close to those of the natural musical instruments.

Figure 2:
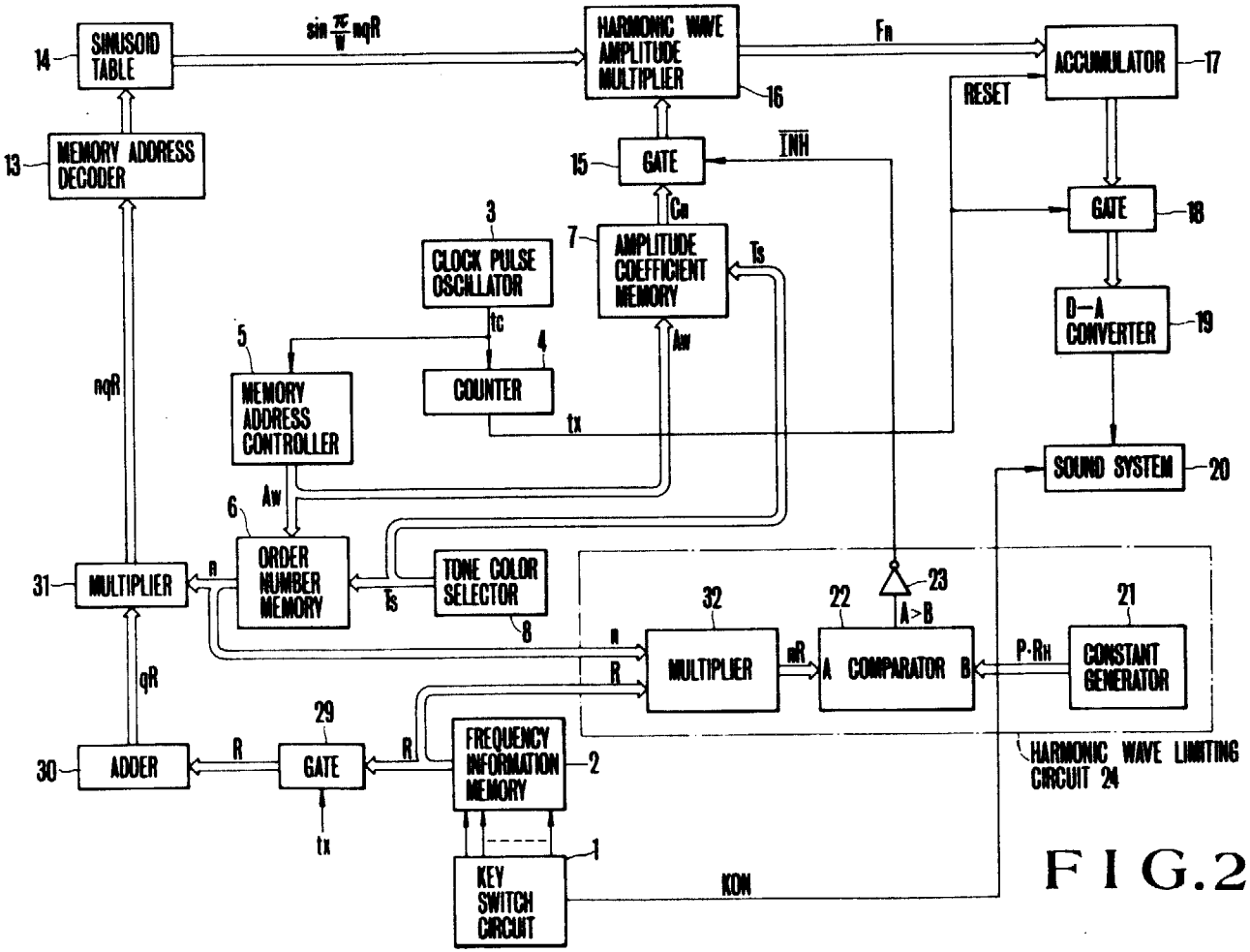
FIG. 2 is a block diagram showing a modified embodiment of this invention.

FIG. 2 shows a modified embodiment of this invention in which elements corresponding to those shown in FIG. 1 are designed by the same reference numerals. This modification is different from the embodiment shown in FIG. 1 in that a different method is used to prepare a computed value nqR used to read out sine wave amplitude values sin ($\pi$/W) nqR for respective harmonic waves from the sinusoid table 14. More particularly, the frequency information R read out from the frequency information memory device 2 is applied to an accumulator 30 through a gate circuit 29 each time a computation interval timing signal $t_x$ is generated to form an accumulated value qR. This accumulated value is multiplied with an order number n produced by the order number memory device 6 by a multiplier 31 and the product nqR is applied to the sinusoid table 14 through the memory address decoder 13 to act as an address signal to read out sine wave amplitude signals sin ($\pi$/W) nqR for respective harmonic components. Accordingly, this modification too can generate a musical tone by the synthesis of harmonic components of the desired orders in the same manner as the first embodiment. In FIG. 2 the circuit elements bounded by dot and dash lines, and the gate circuit 4 connected to the output of the amplitude coefficient memory device 7 constitute a harmonic limiting circuit 24 which prevents generation of certain harmonic components as in the first embodiment.

The detail of the harmonic limiting circuit 24 will now be described. In the embodiments shown in FIGS. 1 and 2, to further improve the quality of the produced musical tone there is a case where it is advantageous to prevent generation of certain harmonic components. Let us denote the frequency of the computing interval timing signal $t_x$ generated by the counter by $f_s$ (representing the sampling frequency). The maximum frequency of the harmonic component that can be produced by the sinusoid table 14 with this sampling frequency $f_s$ is $f_s/2$ according to well known sampling theorem. If one tries to generate harmonic components having frequencies higher than $f_s/2$ unwanted noise (folded noise) would be resulted. For this reason, it is necessary to limit the maximum frequency of the harmonic components read out from the sinusoid table 14 to be less than $f_s/2$.

Since the frequency of the nth harmonic component of a musical tone having a fundamental frequency of f is expressed by nf, it is evident that this frequency should satisfy the following relationship according to the sampling theorem described above.

$$n \cdot f \leqq \frac{f_s}{2}$$

Where the musical tone frequency corresponding to a key having the highest tone pitch is expressed by $f_H$ and where the maximum number of order of the harmonic component that can be synthesized is expressed by P, the frequency of this harmonic component is shown by $P \cdot f_H$ which also must satisfy the following relationship $$P \cdot f_H \leqq \frac{f_s}{2}$$

Considering the sampling theorem and the circuit conditions it is most advantageous to establish a condition $$\frac{f_s}{2} = P \cdot f_H$$

so that it is possible to change $$n \cdot f \leqq \frac{f_s}{2}$$

to $$n \cdot f \leqq P \cdot f_H$$

On the other hand, the frequency of the generated musical tone is determined by the frequency information R and is proportional thereto. Accordingly, it is possible to rewrite $n \cdot f \leqq P \cdot f_H$ as $$n \cdot R \leqq P \cdot R_H$$

In this connection $R_H$ corresponds to $f_H$ and $F \cdot R_H$ is a constant.

From the foregoing description it can be understood that the harmonic component read out from the sinusoid table 14 must satisfy the condition of $n \cdot R \leqq P \cdot R_H$. Thus any harmonic component that does not satisfy this condition would not satisfy the sampling theorem so resulting in a folded noise. To prevent this, in a harmonic component in which $$n \cdot R > P \cdot R_H$$

it is necessary to prevent generation of its amplitude coefficient $C_n$ and to make zero the amplitude value of the harmonic component. To this end, it is necessary to multiply the frequency information R (the output of the frequency information memory device 2) of the musical tone to be generated with the order number n (the output of the order number memory device 6) of a designated harmonic component, and then compare the product n·R with the constant $P \cdot R_H$ described above so as to make zero the amplitude coefficient $C_n$ corresponding to the designated harmonic component where $n \cdot R > P \cdot R_H$. In other words, the amplitude coefficient memory device 7 is prevented from producing an output when $n \cdot R > R \cdot R_H$. In FIGS. 1 and 2, reference numeral 15 represents a gate circuit that blocks the amplitude coefficient supplied from the amplitude coefficient memory device 7 to the harmonic amplitude multiplier 16, 21 a constant generator that generates the constant $P \cdot R_H$, 22 comparator which compares the product nR of the order number n and the frequency information R with the constant $P \cdot R_H$ for applying an inhibition signal INH to the harmonic wave amplitude multiplier 16 via the inverter 23 and the gate circuit 15, and 32 a multiplier which multiplies the order number n by the frequency information R.

Where this harmonic wave limiting circuit is added, musical tones of extremely high quality free from any unwanted noise can be produced.

As above described, the invention provides an improved electronic musical instrument in which the order of the harmonic component necessary to form a musical tone of a desired color is freely selected and computed so as to generate the harmonic component of the orders necessary for obtaining the desired tone color without forming any unwanted harmonic wave component. Accordingly, even when the total number of the harmonic wave components that can be synthesized is limited it is possible to synthesize a musical tone containing a substantial number of harmonic wave components within the limit. Moreover, the electronic musical instrument of this invention can produce high quality musical tones with a relatively simple circuit construction.

What is claimed is:

1. An electronic musical instrument of a harmonic synthesis type comprising:

means of generating a frequency information output representative of a tone pitch of a depressed key of a keyboard of said electronic musical instrument, harmonic number memory means for storing harmonic numbers representative of corresponding harmonic wave components required to produce a selected tone color of a musical tone to be produced, amplitude coefficient memory means for storing amplitude coefficients representative of the amplitudes of the respective harmonic wave components corresponding to the respective harmonic numbers stored in said harmonic number memory means, means responsive to the output of said frequency information generating means and to the harmonic numbers stored in said harmonic number memory means for producing a plurality of tone partial component waves having instantaneous wave values, each partial component wave being representative of a respective one of said harmonic wave components, multiplying means for multiplying said instantaneous wave values of each partial component wave by the coefficient from said amplitude coefficient memory device corresponding with the harmonic wave component represented by that partial component wave to produce a product signal representative thereof, and means for synthesizing an audio signal in response to the product signal produced by said multiplying means.

2. An electronic musical instrument according to claim 1 which further comprises means for selecting a harmonic number stored in said harmonic number memory means and an amplitude coefficient stored in said amplitude coefficient memory means in accordance with a musical tone to be generated.

3. An electronic musical instrument according to claim 2 which further comprises means for varying the harmonic numbers stored in said harmonic number memory means in accordance with a tone color of a musical tone to be generated.

4. An electronic musical instrument according to claim 2 which further comprises means for producing a predetermined number of harmonic numbers from said harmonic number memory means regardless of a tone color of a musical tone to be produced.

5. An electronic musical instrument according to claim 1 wherein said harmonic number memory means produces harmonic number outputs at predetermined intervals on a time division basis, and wherein said means for producing said tone partial component waves comprises second means for multiplying the output of the frequency information generating means by the outputs of said harmonic number memory means to produce outputs representative thereof, means for sequentially accumulating the outputs of said second multiplying means at predetermined intervals, and wave memory means responsive to the outputs of said accumulating means for sequentially reading out sample values of a wave so as to send out said plurality of tone partial component waves on the time division basis.

6. An electronic musical instrument according to claim 1 wherein said harmonic number memory means repeatedly produces outputs at predetermined intervals and on a time division basis, and wherein said means for generating the tone partial component waves comprises accumulator means for accumulating the output of said frequency information generating means at a repetition period of said predetermined intervals and for providing outputs representative thereof, second means for sequentially multiplying the outputs of said accumulator by the numbers in said harmonic number memory means and for providing an output representative thereof, and wave memory means, responsive to the output of said multiplying means, for sequentially reading out outputs representative of a selected waveform thereby sending out said plurality of tone partial component waves on a time division basis.

7. An electronic musical instrument according to claim 1 which further comprises:

second means for multiplying the output of said frequency information generating means by the harmonic numbers stored in said harmonic number memory device and for producing an output representative thereof, means for producing a constant representative of the frequency of tone partial component waves that can be produced by the instrument, and means for preventing said amplitude coefficient memory device from sending out an output when the output of said second multiplying means becomes larger than said constant.

*8. An electronic musical instrument of a harmonic synthesis type comprising:*

*means for generating a digital frequency information output representative of a tone pitch of a depressed key of a keyboard of said electronic musical instrument,*

*harmonic number generating means for generating digital harmonic numbers at least two of which are nonconsecutive, said generated harmonic numbers being representative of corresponding harmonic wave components required to produce a selected tone color of a musical tone to be produced, said tone color being one in which not all harmonic wave components between the fundamental and the highest included harmonic wave component are present*

*amplitude coefficient generating means for generating digital amplitude coefficients representative only of the amplitudes of the respective harmonic wave components corresponding to the respective harmonic numbers generated by said harmonic number generating means,*

*computing means for producing partial tone component waves by combining said frequency information output with each of said harmonic numbers and with each of the corresponding amplitude coefficients, and*

*means for combining said partial tone component waves and for producing a musical tone therefrom.*

*9. An electronic musical instrument of a harmonic synthesis type comprising:*

*keyboard means having a plurality of keys,*

*frequency information generating means for generating frequency information of a depressed one among said keys,*

*tone color selecting means for selecting a tone color of a musical tone to be produced,*

*harmonic information generating means for generating harmonic informations corresponding to harmonic numbers of harmonic wave components required to produce a musical tone of said selected tone color,*

*amplitude information generating means for generating amplitude informations representative of the amplitudes of the respective harmonic wave components,*

*phase angle information generating means responsive to said frequency informations and said harmonic informations for producing phase angle informations representative of instantaneous phase angles of respective partial tone component waves, each partial tone component wave being representative of a respective one of said harmonic wave components,*

*wave generating means responsive to said amplitude informations and said phase angle information for generating said harmonic tone component waves, the amplitude value and the instantaneous phase angle value of each of said partial tone component waves being determined by corresponding ones of said amplitude informations and said phase angle informations respectively, and*

*synthesizing means for producing said musical tone by combining said partial tone component waves.*

*10. In an electronic musical instrument of the type wherein a musical tone is synthesized in real time by computing sequential sample point amplitudes of the tone, the improvement comprising:*

*first means for calculating the constituent sample point amplitudes of a certain number of specified harmonic components and combining these to obtain each computed sample point amplitude, and*

*means for specifying, in response to the selection of a desired tone color, a subset of harmonic components the constituent amplitudes of which are to be included by said first means in each sample point amplitude computation, said subset containing less than all harmonic components between the fundamental and the calculated harmonic component of highest order value, said certain number being less than the order value of said highest order harmonic component included in the sample point amplitude computation.*

*11. In an electronic musical instrument of the harmonic synthesis type wherein a musical tone is synthesized by obtaining in sequential real time intervals the consecutive sample point amplitudes of the tone, the improvement comprising:*

*first means for calculating the constituent amplitudes of a fixed number of harmonic components in the real time interval allotted to computation of each sample point amplitude, said calculated constituent amplitudes being combined to obtain said each sample point amplitude, and*

*means for specifying, in response to tone color selection, a set of such harmonic components to be calculated by said first means for inclusion in the sample point amplitude, said set including at least two harmonic components the orders of which are nonconsecutive, and wherein the order of at least one calculated harmonic component has a value greater than said fixed number.*

* * * * *